July 31, 1945.   C. E. MAITLAND   2,380,774
ELECTRIC CONDENSER
Filed April 15, 1943

CYRIL E. MAITLAND
INVENTOR.

BY
ATTORNEY

Patented July 31, 1945

2,380,774

UNITED STATES PATENT OFFICE 2,380,774

ELECTRIC CONDENSER

Cyril Edmund Maitland, Harrow, England, assignor to The Hartford National Bank and Trust Company, Hartford, Conn., as trustee Application April 15, 1943, Serial No. 483,203
In Great Britain March 27, 1942

4 Claims. (Cl. 192—8)

This invention relates to electrical condensers and more particularly to adjustable electrical condensers of the type in which the adjustment of the capacity is effected by rotation of a control shaft in relation to a fixed nut or by rotation of a nut in relation to a fixed shaft, the movement of the shaft or nut as the case may be producing a relative displacement of the electrode plates of the condenser by rotation and/or by longitudinal displacement. Such condensers are widely used as pre-set or trimmer condensers and in such use it is necessary that once these condensers have been adjusted to their desired capacity value no further displacement of the adjusting means should occur due to shock, vibration and/or by inadvertent handling.

According to the present invention the rotatable control means is locked by means of two helical springs, the internal diameter of which is slightly smaller than the shaft which they embrace. Each of the springs is anchored at one end and so arranged that rotation of the control means in one direction tends to tighten one spring which consequently opposes rotation in that direction, while rotation in the other direction tends to tighten the other spring which consequently prevents rotation in the other direction. The free end of each spring is constituted as or provided with a projecting lever which can be manipulated to loosen the spring to permit rotation of the control means for any desired adjustment. Conveniently springs of the same pitch are mounted side by side with their adjacent ends anchored.

In many cases the rotatable control means is a threaded shaft which carries one or more of the condenser plates so that rotation of the shaft causes movement of this plate or these plates in the axial direction of the shaft. Where such a threaded shaft is employed the springs are advantageously of the same helical pitch as the screw thread and are received by the screw thread. In this way a large area of contact can be obtained between the locking springs and the shaft.

The locking springs can conveniently be anchored in diametrically opposed bosses with the levers at the free ends of the springs projecting in the spaces between the bosses.

The use of a pair of helical springs as defined above gives reliable locking while permitting ready adjustment to any desired setting. The locking means do not impede readjustment nor does their action tend to modify the adjusted position.

The invention will be further described with reference to the appended drawing in which.

Figure 1:
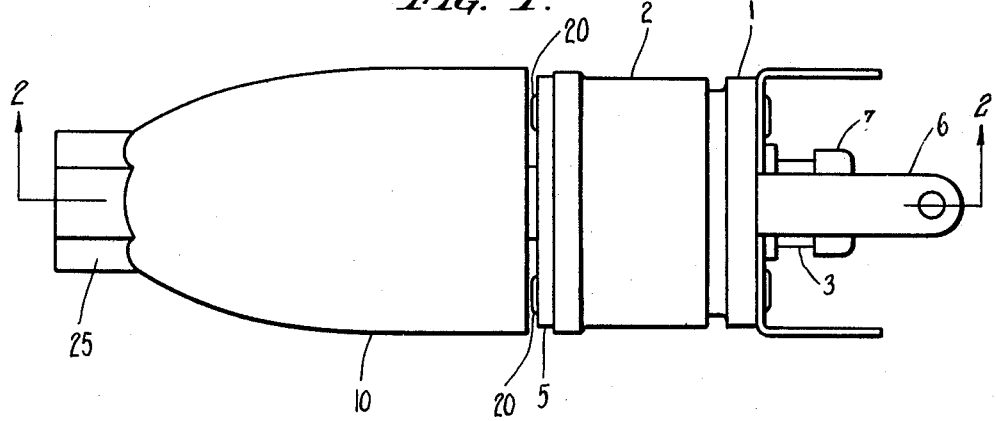
Fig. 1 is a side elevation of a condenser embodying the invention.

The condenser is of the concentric type and comprises two sets of cylinders 1 and 2 constituting the condenser electrodes. Each set of cylinders is mounted on a corresponding end plate and each unit may conveniently be made from a light metal such as aluminum, by casting. In the example illustrated, the condenser electrodes 1 are stationarily mounted on an insulating sleeve 3 preferably of steatite or other low-loss material. The condenser electrodes 2 are rotatably and slidably supported on the sleeve 3 to enable the capacity of the condenser to be adjusted by varying the degree of overlap or interpenetration of the two sets of electrodes 1 and 2.

Passing co-axially through the sleeve 3 is a metal rod 4 the left hand end of which (Fig. 2) is of greater diameter than the bore in the sleeve 3 and abuts against the adjacent end of the sleeve 3. The other end of the rod 4 is soldered to a metal cap 7 embracing the corresponding end of the sleeve 3. In this way the rod 4 is immovably secured to the sleeve 3. The left hand end (Fig. 2) of the rod 4 is provided with a screw thread 14 and terminates in stop block 15. Embracing the screw thread 14 are two oppositely wound helical springs 16, 17. These springs are preferably of the same pitch as the screw thread 14 and of such internal diameter that they have to be expanded somewhat to embrace the screw thread and thus exert a gripping action thereon The adjacent ends 18, 19 of the springs 16, 17 are anchored in bracket members 5 which are secured to the electrode unit 2, for example by rivets 20. Alternatively, the brackets 5 could be made integrally with the electrode unit 2. In the example illustrated, the spring ends 18, 19 are inserted in slots 9 in the members 5 and are secured by compressing the sides of the slots, as is apparent from Fig. 3.

The free ends 21, 22 of the springs 16, 17 extend substantially radially in the space between the two upstanding components of the brackets 5 in which the ends 18, 19 are anchored. The springs 16, 17 thus constitute a nut in threaded engagement with the threaded part 14 of the shaft 4. The springs exert a locking action in opposite senses so that inadvertent rotation of the nut 16, 17 on the thread 14 is prevented. By displacement of one or both of the free ends 21, 22, the nut can be released for rotation in either or both directions, thereby enabling adjustment of the condenser electrodes 2 in relation to the electrodes 1.

To facilitate the adjustment, the following arrangement is provided. In the threaded engagement with the thread 14 is a cap 10 which serves to protect and enclose the springs 16, 17. This cap 10 is coupled with the nut 16, 17 by means of an internal rib 23 extending into the gap between the free ends 21, 22 of the springs, as best seen from Fig. 3. Referring to Fig. 3, rotation of the cap 10 in clockwise direction initially causes the rib 23 to engage the end 22 of the spring 17 thereby slackening the grip of this spring on the thread 14. Further clockwise rotation causes the nut 16, 17 to rotate in the same direction together with the brackets 5 and the electrode unit 2. The last mentioned consequently moves to the right in Fig. 2. Rotation in the reverse direction gives rise to corresponding movement of the electrode unit 2 in a precisely similar manner. The cap 10 is preferably of insulating material such as the synthetic resin product known under the name "Bakelite" or other convenient plastic. The thread for engagement with the screw 14 may be formed directly in the cap 10 or in a metal bush secured to the cap.

To prevent the electrode unit 2 from being advanced too far into the electrode unit 1, the cap 10 is provided with a stop screw 11 adapted to engage the stop block 15 on the end of screw 14. After adjustment of the stop screw 11 it is locked in relation to the cap 10 in any convenient manner, such as by running in wax 12 or a low-melting point alloy. The stop screw 11 can then be concealed by a press-in cap 13. The cap 10 can be set by hand or by a spanner or like tool engaging a hexagon nut 25 formed on the outer end of the cap 10.

The electrical connection to the electrode unit 1 is obtained by means of tags 6 integral with or secured to the unit 1. In the example illustrated, the tags 6 are provided on a plate secured to the unit 1 by rivets 26. The connection to the electrode unit 1 may be derived from the shaft 4 by way of the springs 16, 17 and the brackets 5.

Figure 2:
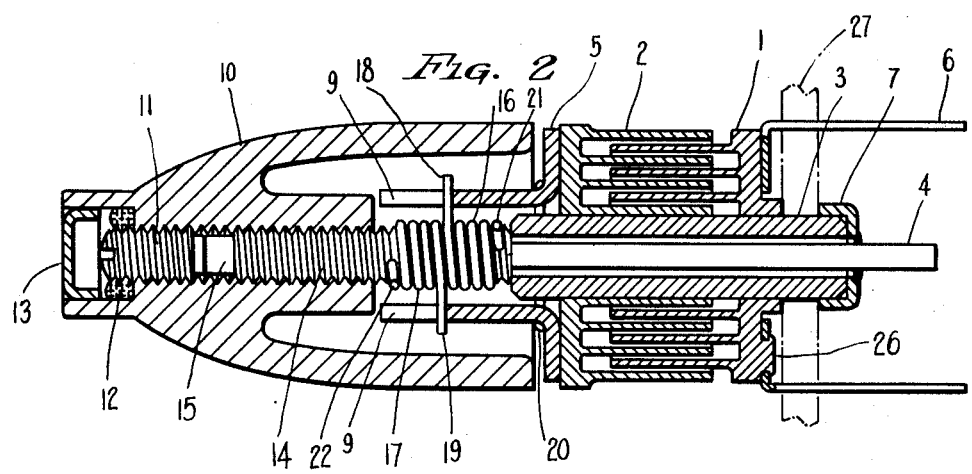
Fig. 2 is a longitudinal section along the line II—II of Fig. 1.
Figure 3:
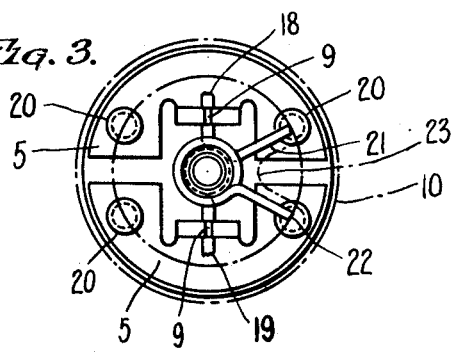
Fig. 3 is an end view of the condenser looking on the left hand end in Fig. 1 or 2 with the cap removed.
Figure 4:
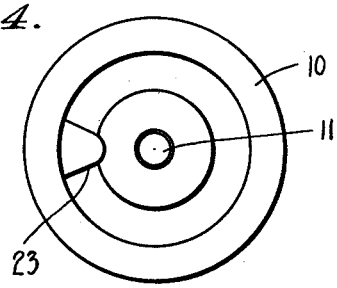
Fig. 4 is an end view of the cap as seen from the right hand end in Fig. 1 or 2.

If the condenser is to be mounted on a panel, the panel may conveniently occupy the position indicated at 27 in Fig. 2. The panel 27 is provided with openings to receive the tags 6 and the sleeve 3 and these components may be so arranged as to serve as anchoring means securing the condenser to the panel.

Instead of the springs 16, 17 constituting a nut travelling on a stationary shaft the converse arrangement could be adopted; equally a separate nut could be provided and the springs serve only for locking purposes.

While I have described my invention by means of specific examples and in a specific embodiment I do not wish to be limited thereto for obvious modifications will appear to those skilled in the art without departing from the spirit and scope of the invention.

I claim:

1. In an adjustable condenser comprising two electrode units movable with respect to each other for adjusting the capacity of the condenser, rotatable control means for adjusting the position of the electrode units relative to each other and locking means for preventing inadvertent alteration of the position of the electrode units, said control and locking means comprising a threaded shaft member rigidly attached to one electrode unit, two helical springs arranged side by side on said shaft in engagement with the threads thereof, a cap member surrounding the springs and being in separate engagement with said shaft and rotatable thereon, an opposite end of each spring being anchored with respect to the second electrode unit, the other end of each spring being free, said cap member comprising an internally projecting portion extending between the free ends of the springs, said projecting portion engaging the free end of one spring on rotation of the cap in one direction and engaging the free end of the other spring on rotation of the cap in the other direction.

2. In an adjustable condenser comprising two coaxial electrode units axially adjustable with respect to each other for adjusting the capacity of the condenser, rotatable control means for adjusting the position of the electrode units relative to each other and locking means for preventing inadvertent alteration of the position of the electrode units, said control and locking means comprising a threaded shaft member rigidly attached to one electrode unit, two helical springs arranged side by side on said shaft in engagement with the threads thereof with an opposite end of each spring anchored with respect to the second electrode and the other end of each spring being free, a cap member surrounding said springs in separate and rotatable engagement with said shaft and comprising a preset stop member and an internally projecting portion, said stop member limiting the movement of said cap member in one direction on said shaft and said internally projecting portion engaging the free end of one spring on rotation of the cap in one direction and engaging the free end of the other spring on rotation of the cap member in the other direction.

3. In an adjustable condenser comprising two electrode units movable with respect to each other for adjusting the capacity of the condenser, rotatable control means for adjusting the position of the electrode units relative to each other and for locking the said electrodes to prevent inadvertent alteration of the position of the electrodes, said control and locking means comprising a threaded shaft member rigidly fixed with respect to one electrode unit, a pair of helical springs arranged side by side on said shaft in engagement with the threads thereof each having an opposite end secured to the second electrode and the other end free, and means to engage the free ends of said springs to rotate said springs relative to the threaded shaft.

4. In an adjustable condenser comprising two electrode units movable with respect to each other for adjusting the capacity of the condenser, rotatable control means for adjusting the position of the electrode units relative to each other and for locking the said electrodes to prevent inadvertent alteration of the position of the electrodes, said control and locking means comprising a threaded shaft member rigidly fixed with respect to one electrode unit, a pair of helical springs arranged side by side on said shaft in engagement with the threads thereof each having an opposite end secured to the second electrode and the other end free, and means to rotate said springs relative to the said shaft, said means comprising a rotatable element engaging said shaft and having a rib portion, said rib portion engaging the free end of one spring on rotation of the rotatable element in one direction and engaging the free end of the other spring on rotation of the said element in the other direction.

CYRIL EDMUND MAITLAND.